United States Patent [19]
Breuers

[11] 4,184,765
[45] Jan. 22, 1980

[54] COPYING APPARATUS WITH DEVICE FOR TRANSPORTING SHEETLIKE ORIGINALS YET COVERING VARIOUS ORIGINALS FOR EXPOSURE

[75] Inventor: Theo P. C. Breuers, Venlo, Netherlands

[73] Assignee: Océ-van der Grinten N.V., Venlo, Netherlands

[21] Appl. No.: 895,371

[22] Filed: Apr. 7, 1978

[30] Foreign Application Priority Data

Apr. 7, 1977 [NL] Netherlands ............. 7703835

[51] Int. Cl.² ............................................. G03B 27/62
[52] U.S. Cl. .................................................... 355/75
[58] Field of Search ................. 355/13, 75, 76; 271/4, 271/6, 7, 245, 235, 246, 264, 197

[56] References Cited

U.S. PATENT DOCUMENTS

| 3,815,990 | 6/1974 | Newcomb et al. | 355/13 |
| 3,844,522 | 10/1974 | Bleau et a. | 355/754- |
| 3,944,367 | 3/1976 | Hakanson et al. | 355/76 |
| 3,997,265 | 12/1976 | Menon et al. | 355/75 |
| 4,043,665 | 8/1977 | Caldwell | 355/76 |

Primary Examiner—Richard A. Wintercorn
Attorney, Agent, or Firm—Albert C. Johnston

[57] ABSTRACT

A device for covering the exposure plate of a copying apparatus includes a belt driven at intervals for transporting sheetlike originals from a ready position on the device to a copying position in which an original is covered and pressed on the plate by the belt, and the belt is so mounted and positioned that the same device serves for covering and pressing books and other objects of irregular dimensions placed on the plate for copying. A control circuit is provided which coordinates operations of the belt drive with the starting of operation of the copying apparatus and the presence of a sheetlike original in ready position.

4 Claims, 4 Drawing Figures

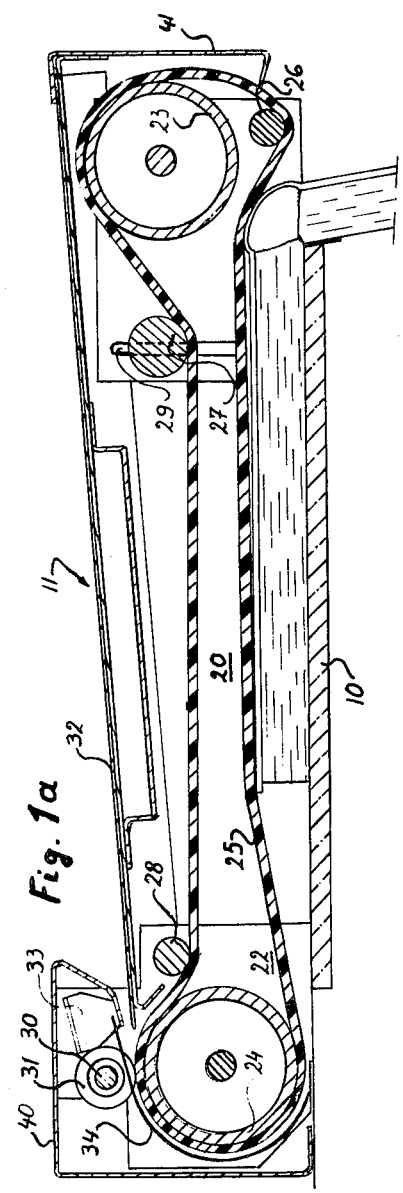

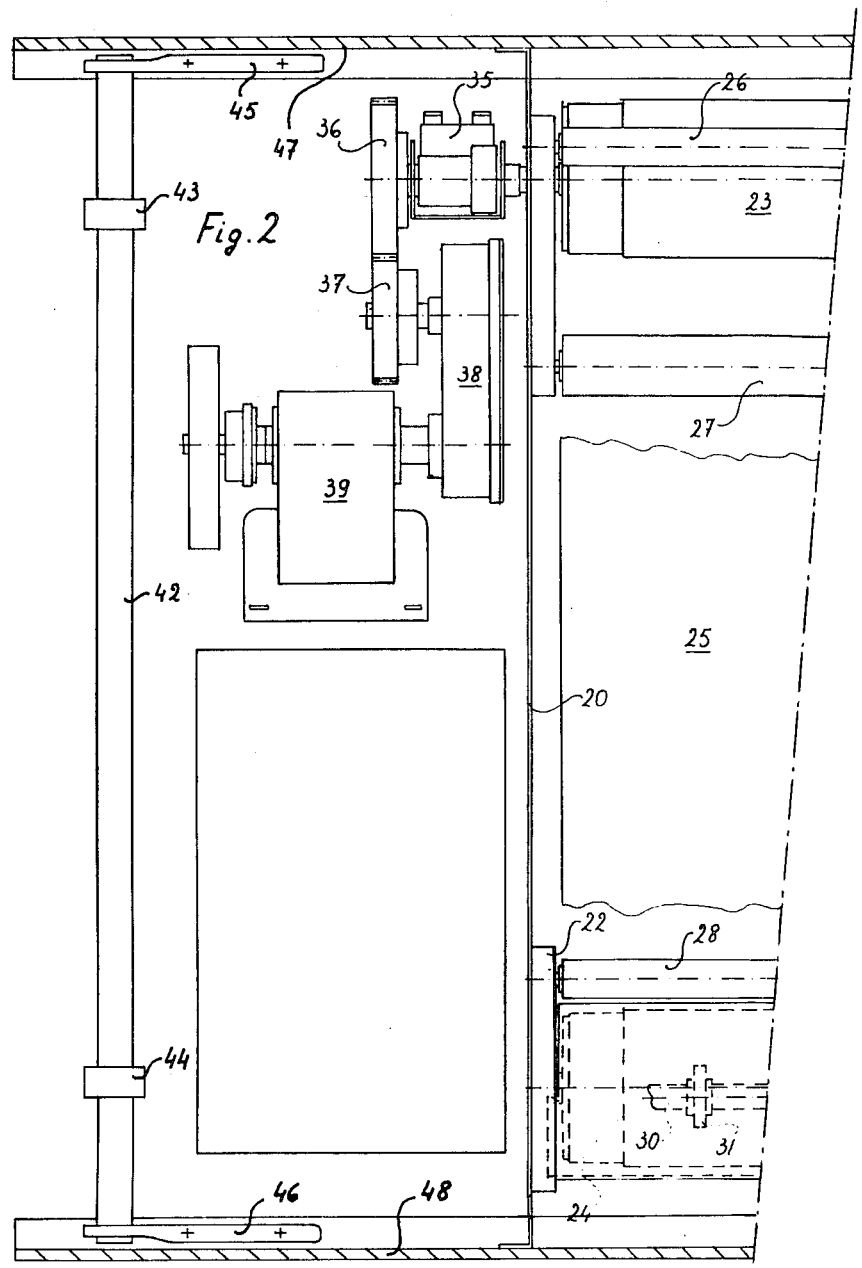

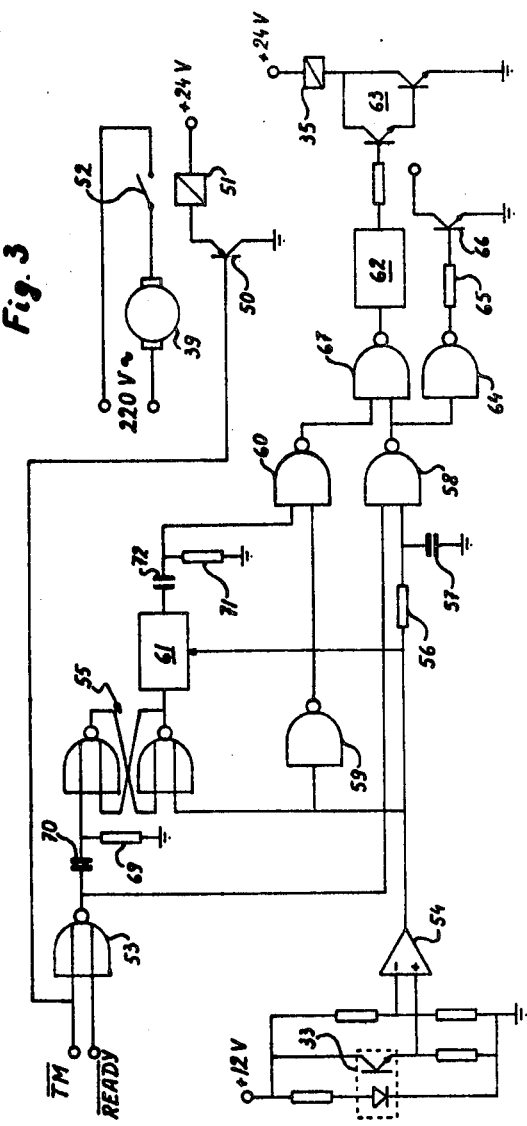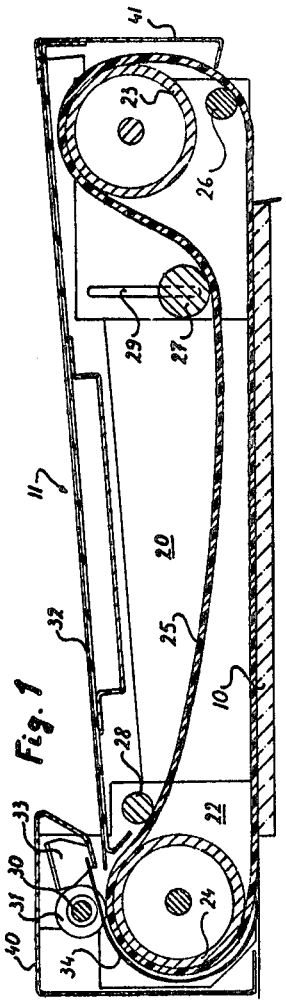

COPYING APPARATUS WITH DEVICE FOR TRANSPORTING SHEETLIKE ORIGINALS YET COVERING VARIOUS ORIGINALS FOR EXPOSURE

This invention relates to a copying apparatus provided with a light pervious plate or window for the exposure of originals to be copied and with a device for transporting sheetlike originals from a position of readiness to a copying position yet also for covering any of various forms of originals positioned on the plate for copying.

Copying apparatus provided with an original transporting and covering device of the general type here involved is disclosed in U.S. Pat. No. 3,815,990. For the use of apparatus equipped with this known device when books or other objects having exceptional dimensions must be placed on the exposure plate, the frame of the document feeding and covering device must be swung back to an out-of-the-way position. When then a cover must still be present over the object to be exposed in order to prevent undesired light emission, another covering device separate from the document feeding device must be used.

An object of the present invention is to provide copying apparatus with a device of the kind mentioned at the outset hereof, by which sheetlike originals or originals having exceptional dimensions can be copied and kept covered during the copying, in a simple way.

Another object of the invention is to provide a control system for coordinating operations of the means for transporting sheetlike originals with the starting of operation of the copying apparatus the presence of a sheetlike original in ready position. According to a principal feature of the invention, in a copying apparatus provided with an exposure plate and with a device for covering an original on the plate and for feeding a sheetlike original from a ready position to a copying position on the plate, which device includes a frame disposed over said plate, rollers rotatable in bearings in the frame, a transport belt positioned by said rollers with a lower flight of the belt extending over and contacting said plate and an upper portion of the belt forming with a roller at its outer side a sheet feeding nip into which an edge of an original may be placed by laying the original in ready position on a surface leading to the nip, and means for driving the transport belt during certain time intervals, the frame of the covering and transporting device is mounted over the exposure plate so that it is displaceable away from the plate to an open position in which the plate is freely accessible to receive a book or other object of exceptional dimensions or shape laid on the plate, and at least one of the belt positioning rollers is supported displaceably relative to the frame so that the position of the belt and the location of its lower flight relative to the plate in the closed position of the frame are determined by the thickness of the object laid on the plate.

By virtue of this arrangement, one and the same covering and transporting device serves effectively for the covering of both sheetlike originals, which it will feed to the plate for copying, and originals having exceptional dimensions, which can be laid onto the plate for copying. Moreover, with thicker originals such as books an especially good contact-pressure and light-tight screening can still be obtained.

The above-mentioned and other objects, features and advantages of the invention will be further understood from the following description of a preferred embodiment, in which reference is made to the accompanying drawings.

In the drawings:
FIG. 1 is a schematic longitudinal cross-sectional view of the transporting and covering device in working position over an exposure plate and as used with sheetlike originals;

FIG. 1a is a schematic longitudinal cross-sectional view of the device of FIG. 1, but now used with a thick original, such as a book;

FIG. 2 is a schematic bottom plan view of the device, in which the belt is partially broken away;

FIG. 3 is a diagram of an electric circuit for controlling operations of the device in relation to operations of a photocopying apparatus.

As shown in FIG. 1, a device 11 for covering originals positioned for copying on the exposure plate of a copying apparatus, and for transporting sheetlike originals to and away from the plate, is arranged in working position over the exposure plate 10 of a copying apparatus not otherwise illustrated. The copying apparatus is, for instance, one of the electrophotographic type in which an original is exposed integrally. It will be understood that the plate 10 is supported in the frame of the copying apparatus.

The device 11 comprises two parallel frame plates 20 between which its functional parts are mounted. First and second pairs of bearing blocks 21 and 22, respectively, are mounted against the inner, or confronting, sides of the plates 20. Only one bearing block of each pair is illustrated in the drawing. A roller 23 is mounted and freely rotatable in the bearing blocks 21, and a roller 24 is mounted and freely rotatable in the bearing blocks 22. An endless belt 25 is positioned about and extends between the rollers 23 and 24 so that the lower flight of this belt extends over the plate 10 and preferably somewhat beyond the respective plate edges nearer to the rollers 23 and 24.

The belt 25 is further positioned and is tensioned by freely rotatable rollers 26, 27 and 28 which also are mounted in the bearing blocks of the frame plates. The rollers 26 and 28 serve as guide rollers. Roller 26 is positioned at a location outside the edge of the plate 10 near roller 23, where it lengthens the reach of the lower belt flight beyond that edge.

At least one of the belt positioning rollers, for instance the roller 27 which bears downward against an upper flight of the belt 25, is supported displaceably relative to the frame of the device 11 as by engagement of the shaft of roller in elongated openings such as the slots 29 provided in the bearing plates 21. Thus, the position of the roller 27 and correspondingly of the belt will change in response to a change of the position or of pressure against the lower flight of the belt.

The belt 25 is made of an elastic material, such as rubber or a synthetic elastomer, and it has a white, suitably reflecting outer surface.

A portion of the belt 25 extending over the roller 24 cooperates at its outer side with a pressing roller to form a nip for feeding a sheetlike original to the exposure plate 10. The pressing roller comprises freely rotatable rubber discs 31 mounted on a shaft 30. The shaft 30 is supported in slots (not shown) so that the rubber discs 31 are pressed down against the belt 25 and the roller 24 by the weight of the shaft 30 and discs 31.

A feed table 32 for positioning sheetlike originals in readiness to be copied extends from a location adjacent to the nip between the discs 31 and the roller 24 to a location over the roller 23. The feed table 32 is provided with an abutment or stop (not shown) along a side thereof for positioning the original laterally. A photoelectric detecting element 33 is mounted at a location just ahead of and above the nip between the discs 31 and the roller 24, so that this element will sense the presence or absence of an original in ready position on the feed table and will emit a signal correspondingly. A guide plate 34 extends about the roller 24 in parallel relation to its circumference from a location at the original feeding nip up almost to one edge of the exposure plate 10.

The shaft of the roller 23 extends outside the frame formed by the plates 20 at one side of this frame (see FIG. 2), where it is connected with the output shaft of an electromagnetic coupling 35, the input shaft of which has a gear 36 fixed thereto. The gear 36 engages with a gear 37 which is connected through a speed reduction gearbox 38 with an electric motor 39. Thus, the roller 23 is driven to drive belt 25 when both the motor 39 and the coupling 35 are energized.

The device 11 is further provided with covering or housing plates, two of which are illustrated at 40 and 41 in FIG. 1. The covering plates are not shown in FIG. 2 for the sake of clarity.

In the use of the device 11 for exposing sheetlike originals the operator places a sheetlike original on the feed table 32 and presses this original by hand into the nip between the belt portion on roller 24 and the discs 31. The operator then operates the print switch of the copying apparatus. As will be explained below, the motor 39 is now started and also the coupling 35 is energized, as a result of which the original is introduced along the guide 34 and onto the exposure plate 10, and is pressed flat on the plate 10 by the lower flight of the belt 25. As soon as the leading edge of the original reaches a predetermined copying position on plate 10, the coupling 35 is de-energized to stop the belt movement, after which the copying cycle is started. After the original has been exposed for the last time in a copying cycle, the coupling 35 is again energized to drive the belt which then moves the original off the plate 10 for delivery of the original into a receiving tray located below the roller 26. If in the meantime a new original has been laid ready on the feed table 32, the new original is automatically introduced while the previous original is being removed from the exposure plate.

In order to stop the original at an exact location on the plate 10, the roller 24 makes a certain number of revolutions upon each energization of the coupling 35. In the embodiment shown it is assumed that by making two revolutions the roller 24 and belt 25 will move an original through a distance which corresponds to the distance between the nip at the discs 31 and a so-called zero-point or desired copying position on the exposure plate.

The complete operation will be further understood from the following description of the electric control circuit, in which reference is made to FIG. 3.

For the control of the device 11 some signals generated by the copying apparatus itself are utilized, for which reason the device 11 is connected electrically with the copying apparatus. A first signal generated by the copying apparatus is the signal TM, which has a value of zero as long as the copying apparatus is not making a copying cycle. As soon as a copying cycle is started, so upon operating the print switch of the copying apparatus, TM becomes one, and it retains this value until the last copy of a copying cycle has left the copying apparatus. In practice, this means that the signal TM becomes one a short time, for instance 0.5 seconds, before the exposure starts and becomes zero again some time, for instance 3 seconds, after the exposure of the last copy of a cycle has been ended.

A signal READY having a value of one exist when the apparatus is in condition to have a new original laid onto the exposure plate 10. Consequently, this signal becomes zero as soon as the print switch is operated, and it becomes one again immediately after the exposure of the last original of a copying cycle has been ended. In the circuit of FIG. 3 the inversed signals of the signals TM and READY are represented.

The signal $\overline{TM}$ is conducted to the base of a transistor 50, the emitter of which is connected via a relay coil 51 with a terminal supplying a control voltage of, for instance, +24V. The collector of the transistor 50 is grounded. The relay coil 51 has a normally open contact 52 which is connected in series with the motor 39 so that the motor will be connected with an alternating current source, for instance of 220V, when the relay coil 51 is energized.

The signals $\overline{TM}$ and $\overline{READY}$ are combined in a NOR-gate 53. The detecting element 33 comprises a LED and a photo-transistor, the latter being connected in a bridge circuit which is connected with an operational amplifier 54.

The output of the NOR-gate 53 is connected via an RC-circuit 69, 70 with the reset input of a flip-flop 55, of which the set input is connected with the output of the operational amplifier 54. The output of this operational amplifier is connected, via a delay circuit consisting of a resistor 56 and a capacitor 57, with an input of a NAND-gate 58, the other input of which is connected with the output of the NOR-gate 53. The output of the operational amplifier 54 is also connected via an invertor 59 with one input of a NAND-gate 60, of which the other input is connected with the set output of the flip-flop 55 via an RC-circuit 71, 72 and a monostable multivibrator 61.

The monostable multivibrator 61 has a delay time almost equal to the time which passes between the end of the exposure for making a copy and the delivery of that same copy by the copying apparatus. The monostable multivibrator 61 is of the type which can be reset, and its reset input is connected with the output of the operational amplifier 54.

The outputs of the gates 58 and 60 are combined in a NAND-gate 67 the output of which is connected with a monostable multivibrator 62, which in its turn is connected through an amplifier 63 with the electromagnetic coupling 35. The coupling 35 in the embodiment shown is desirably a one revolution coupling, i.e., upon each energization the coupling makes one revolution and then de-energizes itself. Since in the operation described the roller 24 must make two revolutions in order to bring an original into copying position, the monostable multivibrator 62 in the energizing circuit of the coupling 35 is provided with such a delay time that the coupling remains energized during about 1.5 revolution.

The output of the gate 58 is connected via an invertor 64 and a resistor 65 with the base of a transistor 66, of which the emitter is grounded and the collector is connected with the print switch of the copying apparatus, so that when the transistor 66 becomes conductive an energization of the print switch is simulated in the control circuit of the copying apparatus.

When a sheetlike original is laid ready on the table 32, first the detector 33 is energized, as a result of which a signal is generated in the output of the operational amplifier 54. This causes the set output of the flip-flop 55 to become zero but has no further consequence, as the monostable multivibrator 61 is triggered only by rising waveparts of a pulse. When subsequently the print switch of the copying apparatus is operated, the signal $\overline{TM}$ becomes zero, and the signal $\overline{READY}$ becomes one. When the signal $\overline{TM}$ becomes zero, this causes the transistor 50 to become conductive, as a result of which the relay coil 51 is energized so that the contact 52 is closed and the motor 39 is started.

In the embodiment illustrated it is assumed that when operating the print switch the signal $\overline{TM}$ becomes zero before the signal $\overline{READY}$ becomes one. When this is not the case in practice, this condition can be obtained by incorporating a delay unit, for instance in the form of an RC-circuit, in the circuit of the signal READY. Thus a short positive pulse is generated in the output of the gate 53 by operating the print switch. This pulse has no influence on the signal in the set output of the flip-flop 55, as the output signal of the amplifier 54 still is one. By combination of the output signals of the gate 53 and the amplifier 54, a short zero pulse is generated in the output of the gate 58, as a result of which a short positive pulse is generated in the output of the gate 67. By the rising wave-part of this pulse the monostable multivibrator 62 is started, and thus the coupling 35 is energized. The original then is introduced to the exposure position on the plate 10, being moved there with the belt 25 by rotation of the roller 24.

After the trailing edge of the original has passed the detecting element 33 the output of the amplifier 54 becomes zero, but this has no direct further consequence. The original is exposed, and when the last exposure of the original is finished the signal $\overline{READY}$ becomes zero. Thus the output of the gate 53 becomes one. Through the RC-circuit 69, 70 a short positive pulse is transmitted, so that the set output of the flip-flop becomes one and the monostable multivibrator 61 is started. If no new original has been laid ready on the feed table 32, the monostable multivibrator 61 will generate a pulse having a length of about 3.5 seconds. When the output of the monostable multivibrator 61 is reset to zero, a short pulse is transmitted via the RC-circuit 71, 72, so that in the output of the gate 60 a short zero pulse is generated. This pulse starts the monostable multivibrator 62 via the gate 67, with the result that the coupling 35 is energized and the exposed original is removed from plate 10.

When a new original is laid ready on the feed table 32 while an original is being exposed, so before the signal $\overline{READY}$ has been reset to zero, this causes a signal to be generated in the output of the amplifier 54. When subsequently the exposure of the original lying on the plate 10 is ended, the signal $\overline{READY}$ will become zero, as a result of which a signal one is generated in the output of the gate 53. This signal again has no influence on the condition of the flip-flop 55, as the set input of this flip-flop is still one. However, in the way described above, a zero signal is generated in the output of the gate 58, which signal starts the monostable multivibrator 62 via the gate 67 and consequently energizes the coupling 35. In this way the processed original is transported away and at the same time the new original lying ready is introduced. At the same time a signal is generated via the gate 64 which simulates an operation of the print switch in the copying apparatus. Thus the exposure of the new original is started automatically.

When a new original is laid ready on the feed table after the exposure of the preceding original has already been ended but before that original has been removed, the output of the amplifier 54 becomes one. As the output of the gate 53 is already one, the output of the gate 58 is consequently set to zero. It should be noted that the output signal of the amplifier 54 is transmitted to gate 58 with some delay via the RC-circuit 56, 57, in order to be sure that the new original has arrived in the nip between the discs 31 and the roller 24. However, before the signal is generated in the output of the gate 58, the monostable multivibrator 61 is reset, and the resulting signal of the monostable multivibrator 61 is blocked in the gate 60 by the output signal of the amplifier 54, which output signal is transmitted via the gate 59. The result is that, after the expiration of the delay time caused by the RC-circuit 56, 57, the original which has been laid ready is immediately introduced, and also a simulation of an operation of the print switch is generated.

When books or other thick objects are to be copied by a copying apparatus equipped with a device according to the invention, the device can be turned upward about a shaft 42 parallel to the plate 20 seen in FIG. 2. This shaft 42 is rotatably mounted in bushes 43 and 44 fixed on the top of the copying apparatus. The ends of the shaft 42 are mounted in brackets 45 and 46 secured to one leg of L-shaped profiles 47 and 48, between which the plates 20 are fixed. In this way the frame formed by the plates 20 is swingably connected to the underlying frame of the copying apparatus. When it is lifted and turned away, the book or suchlike can be placed on the exposure plate 10 and then pressed downward against the plate by moving the device 11 back to a position in which it rests on the thick object through the lower flight of the flexible belt 25. During this covering movement, the belt can adapt itself to the periphery of the book or suchlike (FIG. 1a), as a result of being positioned by the roller 27 displaceable in the slots 29.

In this manner of use of the device, it is desirable that the coupling 35 be kept de-energized. This is assured by the control circuit, since during the removal of the last sheetlike original the output of the flip-flop 55 has become one. When copying books or suchlike, during which no signal is generated by the detecting element 33, the output of the flip-flop never becomes zero and, consequently, the monostable multivibrator 61 cannot be started. Neither can a signal for energizing the coupling 35 be generated via the gate 58, because no signal is generated in the output of the amplifier 54.

I claim:

1. In copying apparatus provided with an exposure plate and a device for covering an original on said plate and including means for transporting a sheetlike original from a position of readiness to a copying position on said plate, said device including a frame disposed above said plate, at least two rollers supported rotatably in bearings in said frame and a transport belt extending about and positioned by said rollers, said belt having a lower flight which extends over and in contact with said plate and having an upper portion cooperating at its outer side with a roller to form a nip for feeding a sheetlike original, a surface adjacent to said nip for supporting a sheetlike original laid upon said surface in ready position with an edge of such original in said nip, and means for driving said belt during certain time intervals, the improvement which comprises said frame being displaceable away from said plate to an open position in which said plate is freely accessible to receive an object laid on said plate for exposure, and means supporting at least one of said belt positioning rollers displaceably relative to said frame so that the position thereof and the location of said belt flight relative to said plate in the closed position of said frame are determined by the thickness of said object.

2. Apparatus according to claim 1 in which said belt positioning rollers comprise two guide rollers and a roller tensioning said belt by bearing downward against an upper flight of said belt, said tensioning roller being mounted and displaceably vertically in slots provided in said frame, and at least one of said guide rollers being located outside the neighboring edge of said plate.

3. In an apparatus according to claim 1 or claim 2 and including means for emitting a signal upon starting of the operation of the copying apparatus and means in the neighborhood of said nip for detecting and emitting a signal upon the presence or absence of a sheetlike original in said ready position, control means including means rendered operative by the combination of said starting signal and a signal emitted by said detecting means to energize initially said belt driving means.

4. Apparatus according to claim 3, said control means also including means operable to energize said belt driving means in response to a signal emitted by said detecting means while the copying apparatus is in operation.

* * * * *